United States Patent
Fukuda et al.

(10) Patent No.: US 10,428,753 B2
(45) Date of Patent: Oct. 1, 2019

(54) CONTROL DEVICE FOR INTERNAL COMBUSTION ENGINE

(71) Applicant: TOYOTA JIDOSHA KABUSHIKI KAISHA, Toyota-shi (JP)

(72) Inventors: Atsushi Fukuda, Toyota (JP); Tomohiro Shinagawa, Sunto-gun (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 116 days.

(21) Appl. No.: 15/514,392

(22) PCT Filed: Sep. 18, 2015

(86) PCT No.: PCT/IB2015/001644
§ 371 (c)(1),
(2) Date: Mar. 24, 2017

(87) PCT Pub. No.: WO2016/046613
PCT Pub. Date: Mar. 31, 2016

(65) Prior Publication Data
US 2017/0248090 A1    Aug. 31, 2017

(30) Foreign Application Priority Data

Sep. 25, 2014  (JP) .................. 2014-194920

(51) Int. Cl.
*F02D 41/08*    (2006.01)
*F02D 31/00*    (2006.01)
(Continued)

(52) U.S. Cl.
CPC ......... *F02D 41/083* (2013.01); *B60H 1/3208* (2013.01); *F02D 31/003* (2013.01);
(Continued)

(58) Field of Classification Search
CPC ................. F02D 41/083; F02D 31/003; F02D 2200/703; F02D 2200/1002; F02D 41/16;
(Continued)

(56) References Cited

U.S. PATENT DOCUMENTS

| 6,109,236 A | 8/2000 | Takahashi et al. |
| 2007/0006572 A1* | 1/2007 | Yu ........................... F01N 3/021 60/285 |

(Continued)

FOREIGN PATENT DOCUMENTS

| CN | 104421016 A | 3/2015 |
| JP | 3-164546 A | 7/1991 |
| JP | 10-325349 A | 12/1998 |

OTHER PUBLICATIONS

International Search Report dated Dec. 23, 2015 in PCT/IB2015/001644 filed Sep. 18, 2015.

*Primary Examiner* — Joseph J Dallo
*Assistant Examiner* — Scott A Reinbold
(74) *Attorney, Agent, or Firm* — Oblon, McClelland, Maier & Neustadt, L.L.P.

(57) ABSTRACT

An ECU avoids engine stall by putting a compressor into a stationary state in a case where the rotation speed of a crankshaft is equal to or less than a predetermined speed during an idle operation of an internal combustion engine. During the idle operation, the ECU calculates a total load torque applied to the crankshaft by the compressor and an alternator. The ECU calculates the maximum torque of the internal combustion engine during the idle operation based on a target speed during the idle operation. Then, the ECU raises the predetermined speed in a case where the value obtained by subtracting the load torque from the maximum torque is equal to or less than a predetermined value.

6 Claims, 5 Drawing Sheets

(51) Int. Cl.
*B60H 1/32* (2006.01)
*F02D 41/16* (2006.01)

(52) U.S. Cl.
CPC ...... *B60H 2001/3273* (2013.01); *F02D 41/16* (2013.01); *F02D 2200/1002* (2013.01); *F02D 2200/703* (2013.01); *F02D 2250/24* (2013.01)

(58) Field of Classification Search
CPC ......... F02D 2250/24; F02D 2200/1006; F02D 2200/101; F02D 2200/1004; B60H 1/3208; B60H 2001/3273; B60W 10/06; B60W 10/30
USPC ........................................................ 123/339
See application file for complete search history.

(56) References Cited

U.S. PATENT DOCUMENTS

2011/0010058 A1* 1/2011 Saito .................. B60W 30/182
 701/50
2015/0066292 A1* 3/2015 Macfarlane ........... B60W 10/06
 701/36

* cited by examiner

CONTROL DEVICE FOR INTERNAL COMBUSTION ENGINE

BACKGROUND OF THE INVENTION

1. Field of the Invention

The invention relates to a control device for an internal combustion engine that is applied to a vehicle traveling by using the power of the internal combustion engine and provided with an auxiliary machine which is driven by the power of the internal combustion engine.

2. Description of Related Art

Rotation speed control for reaching a target speed by using the calculation of a required torque for an internal combustion engine during an idle operation based on a load torque applied to the internal combustion engine and the operation of an actuator of the internal combustion engine in accordance with the required torque is disclosed in, for example, Japanese Patent Application Publication No. 10-325349. Herein, the load torque includes an auxiliary machine load torque applied to a crankshaft by an auxiliary machine.

SUMMARY OF THE INVENTION

For the rotation speed to be controlled to reach the target speed during the idle operation of the device described above, the shaft torque that is required for the internal combustion engine by the required torque needs to be equal to or less than the maximum value of the shaft torque that can be realized in the internal combustion engine. Accordingly, the auxiliary machine load torque may exceed the maximum value of the shaft torque that can be realized in the internal combustion engine in a case where the maximum value of the shaft torque has no room against the auxiliary machine load torque applied to the crankshaft by the auxiliary machine during the idle operation. When the auxiliary machine load torque exceeds the maximum value of the shaft torque that can be realized in the internal combustion engine, the rotation speed of the crankshaft of the internal combustion engine rapidly drops, which may cause the internal combustion engine to be stopped (engine stall).

The invention provides a control device for an internal combustion engine that is capable of inhibiting an engine stall situation even in a case where the maximum value of the shaft torque that can be realized in the internal combustion engine has no room.

According to an aspect of the invention, there is provided a control device for an internal combustion engine applied to a vehicle, the control device including at least one electronic control unit configured to i) execute idle control for controlling a rotation speed of a crankshaft of the internal combustion engine to reach a target speed for an idle operation, ii) decrease a first torque when the rotation speed of the internal combustion engine becomes equal to or less than a predetermined speed during the execution of the idle control, the first torque being a torque applied to the crankshaft of the internal combustion engine by a predetermined auxiliary machine mounted on the vehicle, iii) during the execution of the idle control, a) acquire a second torque, the second torque being the maximum torque that the internal combustion engine is capable of generating, b) acquire a third torque, the third torque being a load torque related to the internal combustion engine including the first torque, and c) acquire a fourth torque, the fourth torque being the maximum value of a shaft torque capable of being realized in the internal combustion engine, and iv) when the idle control is executed based on the second torque and the third torque, set the predetermined speed to be greater when a torque difference is equal to or less than a predetermined value compared to when the torque difference exceeds the predetermined value, the torque difference being a value obtained by subtracting the first torque from the fourth torque. The aspect described above can be defined as follows. The control device for an internal combustion engine is applied to a vehicle traveling by using the power of the internal combustion engine and is provided with an idle control processing unit controlling the rotation speed of the crankshaft of the internal combustion engine to reach the target speed for the idle operation, a reduction processing unit decreasing the auxiliary machine load torque applied to the crankshaft of the internal combustion engine by the predetermined auxiliary machine as one of the auxiliary machines mounted on the vehicle on the condition that the rotation speed of the internal combustion engine is equal to or less than the predetermined speed during the execution of the control performed by the idle control processing unit, a maximum torque acquisition processing unit acquiring the maximum torque that the internal combustion engine is capable of generating during the control performed by the idle control processing unit, a load torque acquisition processing unit acquiring the load torque including the auxiliary machine load torque applied to the crankshaft by the mounted auxiliary machine, and a setting processing unit setting the predetermined speed to be greater in a case where the torque difference by which the maximum value of the shaft torque capable of being realized in the internal combustion engine exceeds the auxiliary machine load torque applied to the crankshaft by the mounted auxiliary machine is equal to or less than the predetermined value than in a case where the torque difference exceeds the predetermined value during the execution of the control performed by the idle control processing unit based on the maximum torque acquired by the maximum torque acquisition processing unit and the load torque acquired by the load torque acquisition processing unit.

During the idle operation of the internal combustion engine, the reduction processing unit decreases the auxiliary machine load torque applied to the crankshaft by the predetermined auxiliary machine prior to a situation in which the rotation speed of the internal combustion engine is reduced for any reason and it becomes difficult to restore the rotation speed of the internal combustion engine to the target speed so that the occurrence of the engine stall can be inhibited eventually. It is more difficult to restore the rotation speed of the internal combustion engine to the target speed in a case where the maximum value of the shaft torque has no room against the auxiliary machine load torque applied to the crankshaft by the auxiliary machine than in a case where the maximum value of the shaft torque has room against the auxiliary machine load torque applied to the crankshaft by the auxiliary machine in a case where the rotation speed of the internal combustion engine is reduced for any reason. Accordingly, in a case where the predetermined speed is set on the assumption that the maximum value of the shaft torque has room, the processing performed by the reduction processing unit so as to decrease the auxiliary machine load torque applied to the crankshaft by the auxiliary machine will not suffice in a case where the maximum value of the shaft torque has no room and the engine stall could occur. In a case where the predetermined speed is set on the assumption that the maximum value of the shaft torque has no room, in contrast, the processing performed by the reduction processing unit so as to decrease the auxiliary machine load torque could be unnecessarily executed in a case where the maximum value of the shaft torque has room.

In this regard, the setting processing unit is provided for the predetermined speed to be set to be greater in a case where the torque difference does not exceed the predetermined value than in a case where the torque difference exceeds the predetermined value and the torque difference by which the maximum value of the shaft torque capable of being realized in the internal combustion engine exceeds the auxiliary machine load torque can be expanded earlier in a case where the rotation speed is reduced in a state where the maximum value of the shaft torque capable of being realized in the internal combustion engine has no room than in a case where the maximum value of the shaft torque capable of being realized in the internal combustion engine has room. Accordingly, an engine stall situation can be inhibited even in a case where the maximum value of the shaft torque capable of being realized in the internal combustion engine has no room. In addition, the execution of the processing performed by the reduction processing unit so as to decrease the auxiliary machine load torque can be inhibited compared to a case where the predetermined speed is set on the assumption that the maximum value of the shaft torque has no room.

In the aspect described above, the electronic control unit may be configured to variably set the second torque in accordance with at least one of a temperature of outside air and a pressure of the outside air.

In the device described above, the maximum torque is variably set in accordance with the temperature of the outside air and the pressure of the outside air, and thus the torque difference described above can be more accurately calculated than in the case of no variable setting. Accordingly, a situation can be inhibited in which the processing for decreasing the auxiliary machine load torque applied to the crankshaft by the predetermined auxiliary machine is carried out by the predetermined speed being raised in a case where the maximum value of the shaft torque capable of being realized has room.

In the aspect described above, the predetermined auxiliary machine may be a compressor for an air-conditioning device mounted on the vehicle. In the device described above, the compressor having no direct effect on functions relating to the traveling of the vehicle is the object of a decrease in the auxiliary machine load torque. Accordingly, a situation can be appropriately inhibited in which the functions relating to the traveling of the vehicle are affected by the processing performed by the reduction processing unit.

In the aspect described above, the electronic control unit may be configured to i) set the predetermined speed to a first value when the torque difference exceeds the predetermined value, and ii) set the predetermined speed to a second value larger than the first value when the torque difference does not exceed the predetermined value.

In the device described above, the predetermined speed is variably set depending on whether or not the predetermined value is exceeded. Accordingly, the processing for inhibiting a situation in which the engine stall occurs in a case where the maximum value of the shaft torque capable of being realized in the internal combustion engine has no room can be relatively simply performed.

In the aspect described above, the electronic control unit may be configured to set the predetermined speed to a value increasing in two or more steps or continuously as the torque difference decreases. The amount of a decline in the rotation speed of the internal combustion engine allowing the restoration to the target speed without decreasing the auxiliary machine load torque applied to the crankshaft by the auxiliary machine decreases as the room in the maximum value of the shaft torque capable of being realized in the internal combustion engine decreases. In this regard, the predetermined speed can be variably set to at least three values in the device described above, and thus the predetermined speed can be set to the minimum level possible depending on the margin of the maximum value of the shaft torque. Accordingly, it is possible to prevent the auxiliary machine load torque applied to the crankshaft by the predetermined auxiliary machine from being minimized.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

First Embodiment

Hereinafter, a first embodiment of a rotation speed control device for an internal combustion engine will be described in detail with reference to accompanying drawings.

Figure 1:
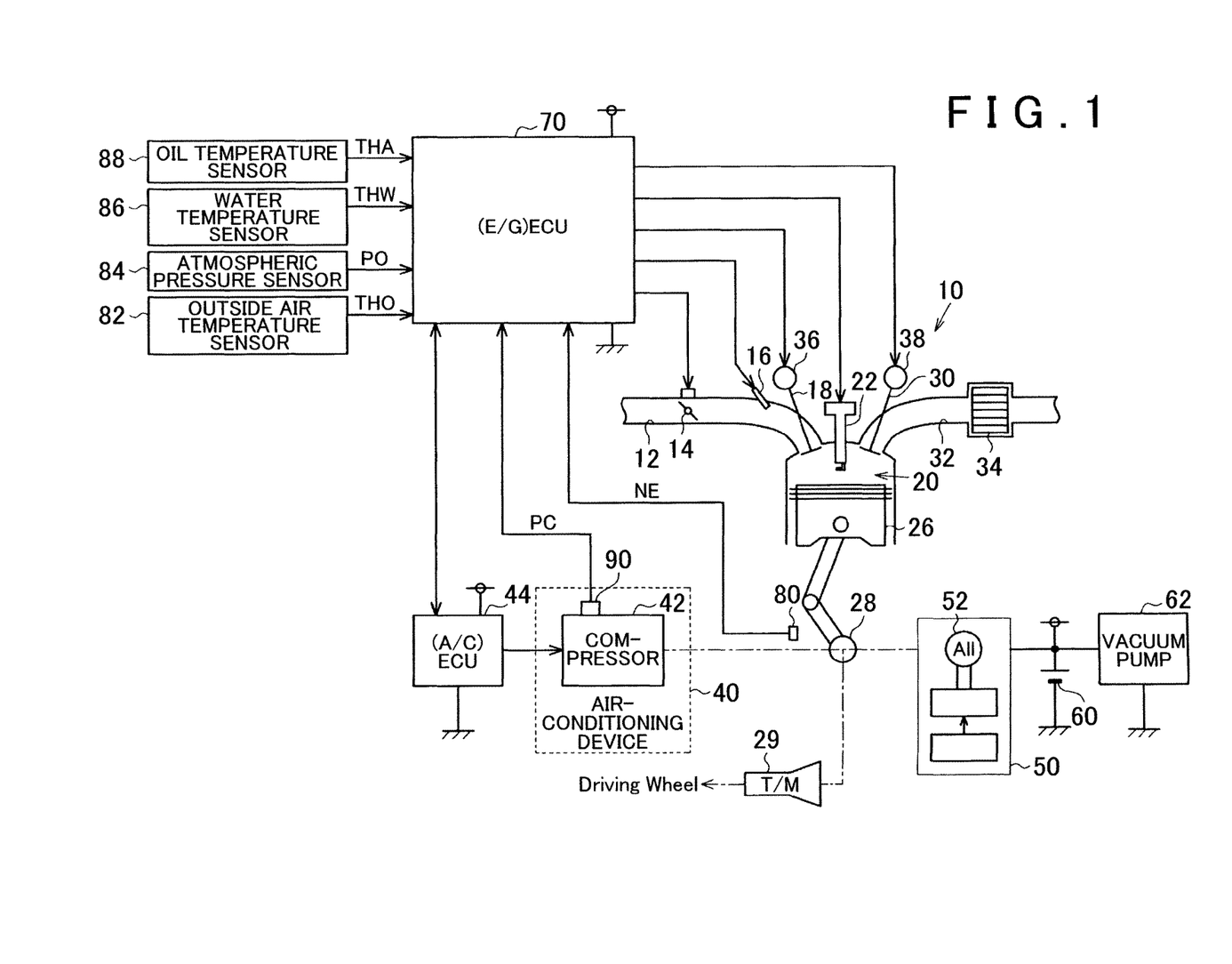
FIG. 1 is a system configuration diagram according to a first embodiment.

An internal combustion engine 10 that is illustrated in FIG. 1 is a low-displacement (for example, "1,500 cc" or less) engine. A throttle valve 14 is disposed in an intake passage 12 of the internal combustion engine 10. The throttle valve 14 adjusts the flow path area of the intake passage 12. In the intake passage 12, a fuel injection valve 16 is disposed downstream from the throttle valve 14. An air-fuel mixture of the air that is suctioned into the intake passage 12 and the fuel that is injected by the fuel injection valve 16 is suctioned into a combustion chamber 20 as a result of the opening of an intake valve 18. A spark plug 22 is disposed in the combustion chamber 20. The air-fuel mixture that is suctioned into the combustion chamber 20 is combusted when the spark plug 22 performs an ignition operation, and the combustion energy is converted into the rotational energy of a crankshaft 28 via a piston 26. The air-fuel mixture provided for the combustion in the combustion chamber 20 is discharged, as exhaust gas, to an exhaust passage 32 as a result of the opening of an exhaust valve 30. A catalyst 34 that purifies the exhaust gas is disposed in the exhaust passage 32.

The valve-opening timing of the intake valve 18 can be variably set by an intake side variable valve timing mechanism 36. The valve-opening timing of the exhaust valve 30 can be variably set by an exhaust side variable valve timing mechanism 38.

The crankshaft 28 of the internal combustion engine 10 is mechanically connected to a driving wheel via a transmission 29. In addition, the crankshaft 28 is mechanically connected to a compressor 42. The compressor 42 is built into an air-conditioning device 40 and compresses a refrigerant for air conditioning. In this embodiment, a variable capacity-type compressor is assumed as the compressor 42. In other words, the compressor 42 is provided with a crank chamber that is filled with the refrigerant as an object of compression, a piston that allows the crank chamber to expand or contract, and a device that allows the piston stroke to vary. The compressor 42 is in a stationary state when the piston stroke is zero and the compressor 42 does not perform an operation for pressurizing the refrigerant. The compressor 42 is in a driving state when the piston stroke exceeds zero and the compressor 42 performs the operation for pressurizing the refrigerant.

An ECU 44 is an electronic control device that controls the air-conditioning device 40. The ECU 44 performs capacity control particularly by manipulating the piston stroke of the compressor 42. In this embodiment, the ECU 44 has a fixed piston stroke value and performs no variable capacity control in a case where the compressor 42 is driven during an idle operation (described later).

The rotating shaft of an alternator 52, which is built into an electric power generation unit 50, is also mechanically connected to the crankshaft 28. The output voltage of the alternator 52 is applied to a battery 60. The battery 60 is electric power storage means for supplying electric power to a vehicle-mounted electronic control device such as the ECU 44 and an electronically-controlled actuator such as the throttle valve 14 and the spark plug 22. The battery 60 supplies electric power to an electric vacuum pump 62 that generates a brake negative pressure in particular. This is for the assumption of a vehicle not using the intake negative pressure of the intake passage 12 in ensuring the brake negative pressure as the vehicle according to this embodiment.

An electronic control unit (ECU) 70 is an electronic control device that controls the internal combustion engine 10. The ECU 70 receives the rotation speed NE of the crankshaft 28 based on a value detected by a crank angle sensor 80, the temperature of outside air (outside air temperature THO) detected by an outside air temperature sensor 82, and an outside air pressure PO detected by an atmospheric pressure sensor 84. In addition, the ECU 70 receives the temperature of a coolant for the internal combustion engine 10 (coolant temperature THW) detected by a water temperature sensor 86, the temperature of a lubricant for the internal combustion engine 10 (oil temperature THA) detected by an oil temperature sensor 88, and the pressure of the refrigerant (refrigerant pressure PC) detected by a refrigerant pressure sensor 90. Various actuators such as the throttle valve 14, the spark plug 22, the intake side variable valve timing mechanism 36, and the exhaust side variable valve timing mechanism 38 are operated based on the respective values described above.

The ECU 70 performs the idle operation for controlling the rotation speed of the crankshaft 28 to reach a target speed by suppressing the output of the internal combustion engine 10 to the minimum within a range in which no engine stall occurs particularly when it is not required for the shaft torque of the internal combustion engine 10 to be applied to the driving wheel. This will be described below with reference to FIG. 2.

Figure 2:
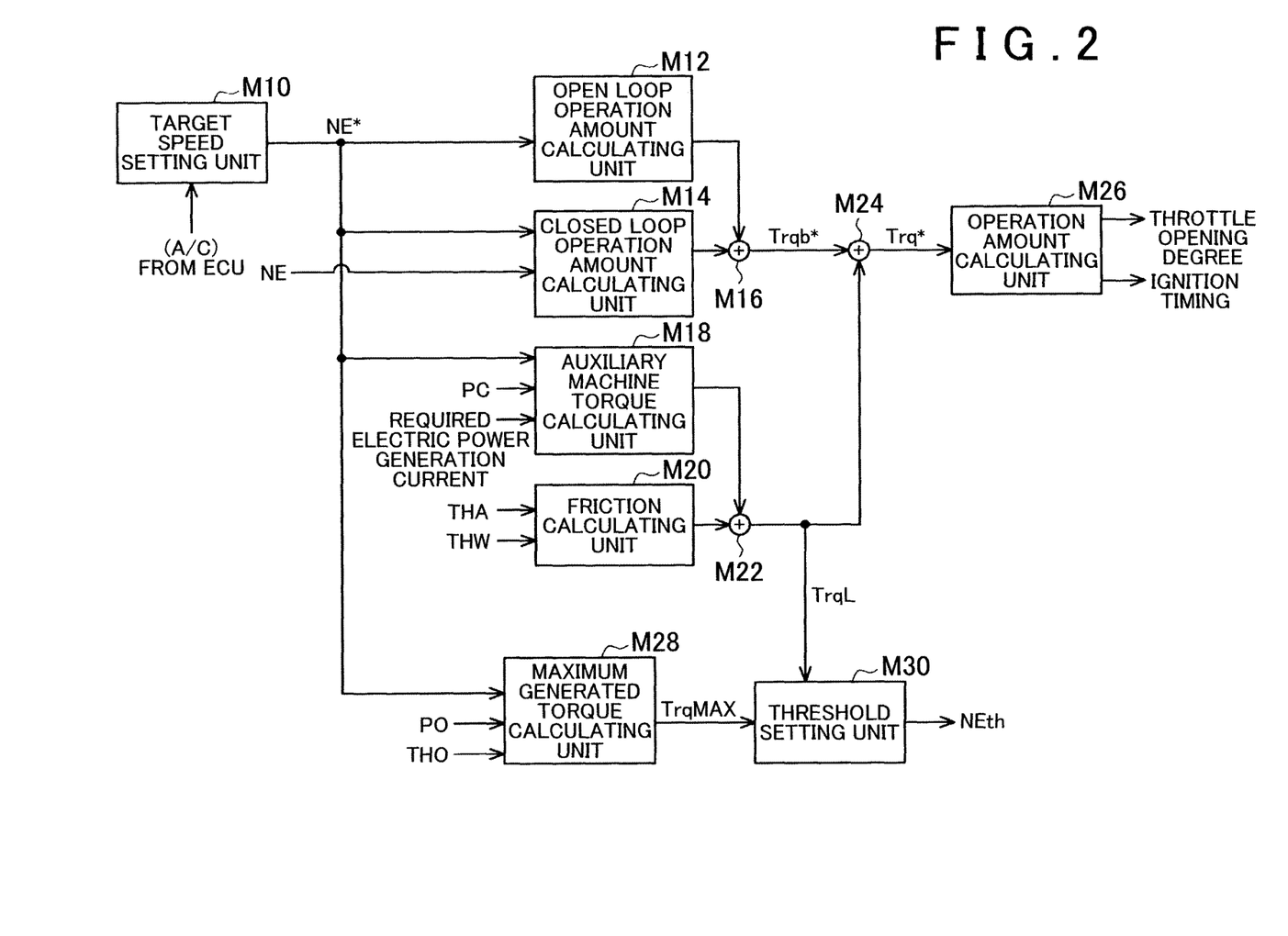
FIG. 2 is a block diagram illustrating the processing that is carried out during an idle operation according to the first embodiment.

FIG. 2 is a functional block diagram illustrating processing related to the idle operation in particular among those realized by the ECU 70. A target speed setting unit M10 sets a target value of the rotation speed NE of the crankshaft 28 (target speed NE*) for the idle operation. Herein, the target speed NE* is variably set, with a signal output from the ECU 44 used as an input, depending on whether the compressor 42 is in the driving state or in the stationary state. Specifically, a greater value is set as the target speed NE* in a case where the compressor 42 is in the driving state than in a case where the compressor 42 is in the stationary state.

An open loop operation amount calculating unit M12 calculates an open loop operation amount for controlling the rotation speed NE of the crankshaft 28 to reach the target speed NE* by using the target speed NE* as an input. The open loop operation amount is a physical quantity that has the dimension of torque "Nm". The open loop operation amount is calculated without regard for a friction load torque corresponding to various frictional forces such as the frictional force between the piston 26 and a cylinder inner wall surface and the frictional force generated during the driving of the intake valve 18 and the exhaust valve 30. In addition, the open loop operation amount is set to a value that is required for the control for reaching the target speed NE* in a case where auxiliary machine load torques applied to the crankshaft 28 by auxiliary machines such as the compressor 42 and the alternator 52 are ignored. It is desirable that the open loop operation amount is calculated in view of, for example, a pumping loss at the target speed NE*.

A closed loop operation amount calculating unit M14 calculates an operation amount (closed loop operation amount) for the feedback control of the rotation speed NE to the target speed NE*. The closed loop operation amount is also a physical quantity that has the dimension of torque.

An adding unit M16 adds the open loop operation amount to the closed loop operation amount and outputs the result as a torque base value Trqb*. An auxiliary machine torque calculating unit M18 calculates the total auxiliary machine load torque applied to the crankshaft 28 by the auxiliary machines such as the compressor 42 and the alternator 52. This auxiliary machine load torque is a physical quantity that shows the load which consumes the shaft torque of the internal combustion engine 10. In this embodiment, the auxiliary machine load torque is calculated as an absolute value. The auxiliary machine load torque that is applied to the crankshaft 28 by the compressor 42 is calculated in view of the target speed NE* and the refrigerant pressure PC. The auxiliary machine load torque that is applied to the crankshaft 28 by the alternator 52 is calculated based on the target speed NE* and a required electric power generation current for the alternator 52. Herein, the required electric power generation current may be acquired from the electric power generation unit 50. In a case where a water pump that allows the circulation of the coolant for the internal combustion engine 10 and an oil pump that allows the circulation of the lubricant for the internal combustion engine 10 are present as the auxiliary machines that apply auxiliary machine load torques interfering with rotation to the crankshaft 28, it is desirable that these auxiliary machine load torques are also calculated and added to the output value of the auxiliary machine torque calculating unit M18. These auxiliary machine load torques can be calculated based on, for example, the target speed NE*.

A friction calculating unit M20 calculates a friction load torque correlated with the frictional forces described above by using the coolant temperature THW and the oil temperature THA as inputs. In other words, the friction calculating unit M20 calculates the amount attributable to the frictional forces in the value obtained by subtracting the shaft torque from an indicated torque. The lower the coolant temperature THW and the oil temperature THA are, the greater the value of the friction load torque is.

An adding unit M22 adds the auxiliary machine load torque calculated by the auxiliary machine torque calculating unit M18 to the friction load torque calculated by the friction calculating unit M20 and outputs the result as a load torque TrqL.

An adding unit M24 calculates a required torque Trq* by adding the torque base value Trqb* output by the adding unit M16 to the load torque TrqL output by the adding unit M22. The required torque Trq* is an indicated torque that is required for the rotation speed NE of the internal combustion engine 10 to become the target speed NE*. In other words, the sum of the output value of the open loop operation amount calculating unit M12 and the output value of the friction calculating unit M20 is an indicated torque for the control for reaching the target speed NE* pertaining to a case where the auxiliary machine load torque applied to the crankshaft 28 by the auxiliary machines is ignored. Accordingly, what is obtained by adding the output value of the auxiliary machine torque calculating unit M18 to this indicated torque is an indicated torque of the internal combustion engine 10 taking into account the auxiliary machine load torque applied to the crankshaft 28 by the auxiliary machines.

An operation amount calculating unit M26 calculates the opening degree of the throttle valve 14 of the internal combustion engine 10 and ignition timing based on the required torque Trq* and manipulates the opening degree and the ignition timing in accordance therewith. Specifically, the opening degree of the throttle valve 14 and the ignition timing are manipulated so that the indicated torque of the internal combustion engine 10 becomes the required torque Trq*. In this embodiment, an actual air-fuel ratio is feedback-controlled to reach a target air-fuel ratio with the target air-fuel ratio used as a theoretical air-fuel ratio when the rotation speed NE is controlled to reach the target speed NE*. Accordingly, the target air-fuel ratio has a fixed value and is not an object of manipulation, and thus is not an operation amount for the indicated torque to become the required torque Trq*. In addition, in this embodiment, the valve-opening timing of the intake valve 18 and the valve-opening timing of the exhaust valve 30 have fixed values when the rotation speed NE is controlled to reach the target speed NE*. Accordingly, the valve timing is not an operation amount for the indicated torque to become the required torque Trq*.

In this embodiment, feed-forward control based on the load torque TrqL is adopted for the control for reaching the target speed NE* as described above. Accordingly, the output of the internal combustion engine 10 during the idle operation can have a smaller value than in a case where the control for reaching the target speed NE* is performed based solely on the feedback control of the rotation speed NE to the target speed NE*. This is because the output of the internal combustion engine 10 during the idle operation needs to be increased to some extent to prevent the engine stall attributable to the overshoot and the undershoot intensifying as transient phenomena relating to load fluctuations in a case where only the feedback control is performed.

In this embodiment, the negative pressure in the intake passage 12 is not used as the brake negative pressure, and thus a request for a negative pressure in the intake passage 12 during the idle operation does not occur. In a case where the negative pressure in the intake passage 12 is used as the brake negative pressure, the maximum value of the total auxiliary machine load torque is set to the value of the shaft torque of the internal combustion engine 10 pertaining to a case where the opening degree of the throttle valve 14 is reduced to the level allowing the use of the negative pressure in the intake passage 12 as the brake negative pressure. In this embodiment, however, the maximum value of the total auxiliary machine load torque can become close to the shaft torque at the maximum opening degree of the throttle valve 14. In this case, however, the engine stall may occur as the setting in this case may remove the room in the maximum value that can be realized as the shaft torque of the internal combustion engine 10 and this may cause, for example, the shaft torque of the internal combustion engine 10 to be exceeded by the load torque for stopping the rotation of the crankshaft 28, which is attributable to an increase in friction, unexpected disturbances, and the like that follow the deterioration of the internal combustion engine 10.

In this embodiment, the compressor 42 is stopped when the rotation speed NE of the internal combustion engine 10 drops below a predetermined speed NEth so that the engine stall is avoided despite the setting that may remove the room as described above while the predetermined speed NEth is raised in a case where the maximum value of the shaft torque that can be realized in the internal combustion engine 10 has no room. This will be described in detail below.

A maximum generated torque calculating unit M28 calculates the maximum value of the torque of the internal combustion engine 10 (maximum torque TrqMAX) available by the execution of the control for reaching the target speed NE*. Herein, the torque has a value that is obtained by subtracting an equivalent to the pumping loss of the internal combustion engine 10 from the indicated torque.

As described above, the valve timing and the target air-fuel ratio are fixed during the execution of the control for reaching the target speed NE*. Accordingly, the maximum torque TrqMAX is calculated with the valve timing and the target air-fuel ratio given. Specifically, the maximum torque TrqMAX is calculated with the ignition timing used as an optimum value. Herein, the optimum value refers to one of two ignition timings that is the retard-side timing, the two ignition timings referring to a Minimum advance for Best Torque (MBT) as the ignition timing when torque generation efficiency is maximized and a trace knock ignition timing as the advance limit of the ignition timing when the occurrence of knocking can be avoided. In addition, the maximum torque TrqMAX is calculated with the opening degree of the throttle valve 14 used as the maximum value. However, filling efficiency is not determined uniquely as the opening degree of the throttle valve 14 is used as the maximum value and the target speed NE* is given. Accordingly, in this embodiment, the outside air temperature THO and the outside air pressure PO as well as the target speed NE* are used so that the filling efficiency pertaining to a case where the opening degree of the throttle valve 14 is used as the maximum value can be figured out with accuracy. In other words, the maximum torque TrqMAX is calculated based on the outside air temperature THO and the outside air pressure PO as well as the target speed NE*.

A threshold setting unit M30 sets the predetermined speed NEth described above, which is a threshold for stopping the compressor 42, based on the maximum torque TrqMAX and the load torque TrqL. This will be described below with reference to FIG. 3.

Figure 3:
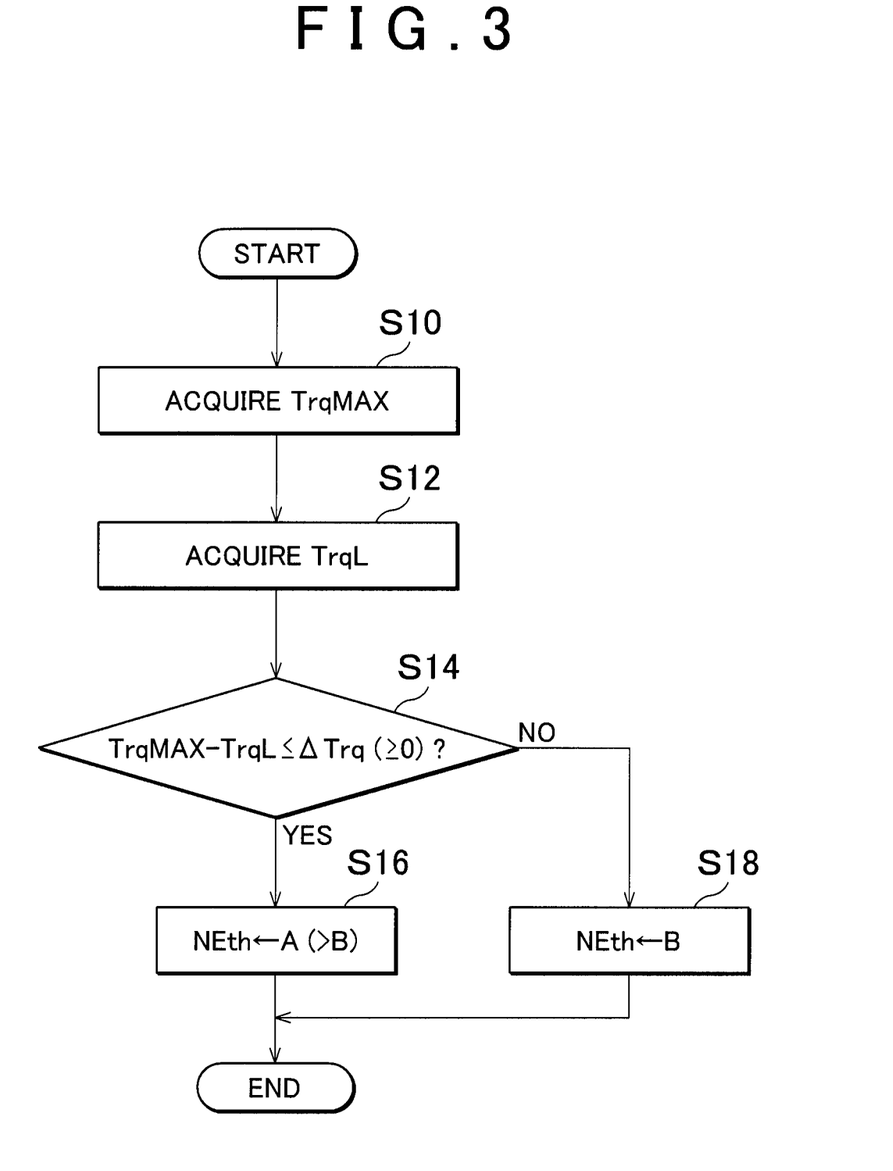
FIG. 3 is a flowchart illustrating the procedure of the processing that is carried out by a threshold setting unit according to the first embodiment.

FIG. 3 shows the processing that is executed by the threshold setting unit M30. This processing is repeatedly executed at, for example, a predetermined cycle during the idle operation. The threshold setting unit M30 acquires the maximum torque TrqMAX at the beginning of this series of processing (S10). Then, the threshold setting unit M30 acquires the load torque TrqL (S12). Then, the threshold setting unit M30 determines whether or not the value that is obtained by subtracting the load torque TrqL from the maximum torque TrqMAX is equal to or less than a predetermined value ΔTrq (S14). This processing is to determine the presence of absence of a situation in which the engine stall is likely to occur due to the lack of the room in the maximum value of the shaft torque that can be realized in the internal combustion engine 10 with respect to the auxiliary machine load torque applied to the crankshaft 28 by the auxiliary machines. In other words, the maximum torque TrqMAX is the value that is obtained by subtracting the load torque of the pumping loss equivalent from the indicated torque. Accordingly, the value that is obtained by subtracting the output value of the friction calculating unit M20 from the maximum torque TrqMAX is the maximum value of the shaft torque that can be realized in the internal combustion engine 10. Accordingly, the value that is obtained by subtracting the load torque TrqL from the maximum torque TrqMAX is the value that is obtained by subtracting the auxiliary machine load torque applied to the crankshaft 28 by the auxiliary machines from the maximum value of the shaft torque that can be realized in the internal combustion engine 10. In other words, the value that is obtained by subtracting the load torque TrqL from the maximum torque TrqMAX is the torque difference by which the maximum value of the shaft torque that can be realized in the internal combustion engine 10 exceeds the auxiliary machine load torque applied to the crankshaft 28 by the auxiliary machines.

It is desirable that the predetermined value ΔTrq is a value equal to or greater than zero. It is particularly desirable that the predetermined value ΔTrq is set to a value exceeding zero in that a torque margin required for the rotation speed NE to be restored to the target speed NE* should be ensured when the rotation speed NE is reduced due to disturbances or the like. In addition, it is desirable that a greater value is set as the predetermined value ΔTrq as the accuracy of the calculation of the maximum torque TrqMAX and the load torque TrqL is lower.

The threshold setting unit M30 sets the predetermined speed NEth as a reference value B in a case where it is determined that the predetermined value ΔTrq is exceeded (S14: NO). The reference value B is set based on the lower limit value of the value that allows the restoration of the rotation speed NE to the target speed NE* even without stopping the compressor 42 in a case where the rotation speed NE of the internal combustion engine 10 is reduced when the maximum value of the shaft torque that can be realized in the internal combustion engine 10 has room.

The threshold setting unit M30 sets the predetermined speed NEth as an anti-stall value A (S16) in a case where it is determined that the predetermined value ΔTrq is not exceeded (S14: YES). Herein, the anti-stall value A is set based on the lower limit value of the value that allows the restoration of the rotation speed NE to the target speed NE* even without stopping the compressor 42 in a case where the rotation speed NE of the internal combustion engine 10 is reduced when the maximum value of the shaft torque that can be realized in the internal combustion engine 10 has no room. In a case where the maximum value of the shaft torque that can be realized in the internal combustion engine 10 has no room, it is difficult to raise the rotation speed NE after the rotation speed NE is reduced. Accordingly, the anti-stall value A is set to a value greater than the reference value B.

The threshold setting unit M30 temporarily terminates this series of processing in a case where the processing of Step S16 and S18 is completed. Effects of the processing described above will be described with reference to FIG. 4.

Figure 4:
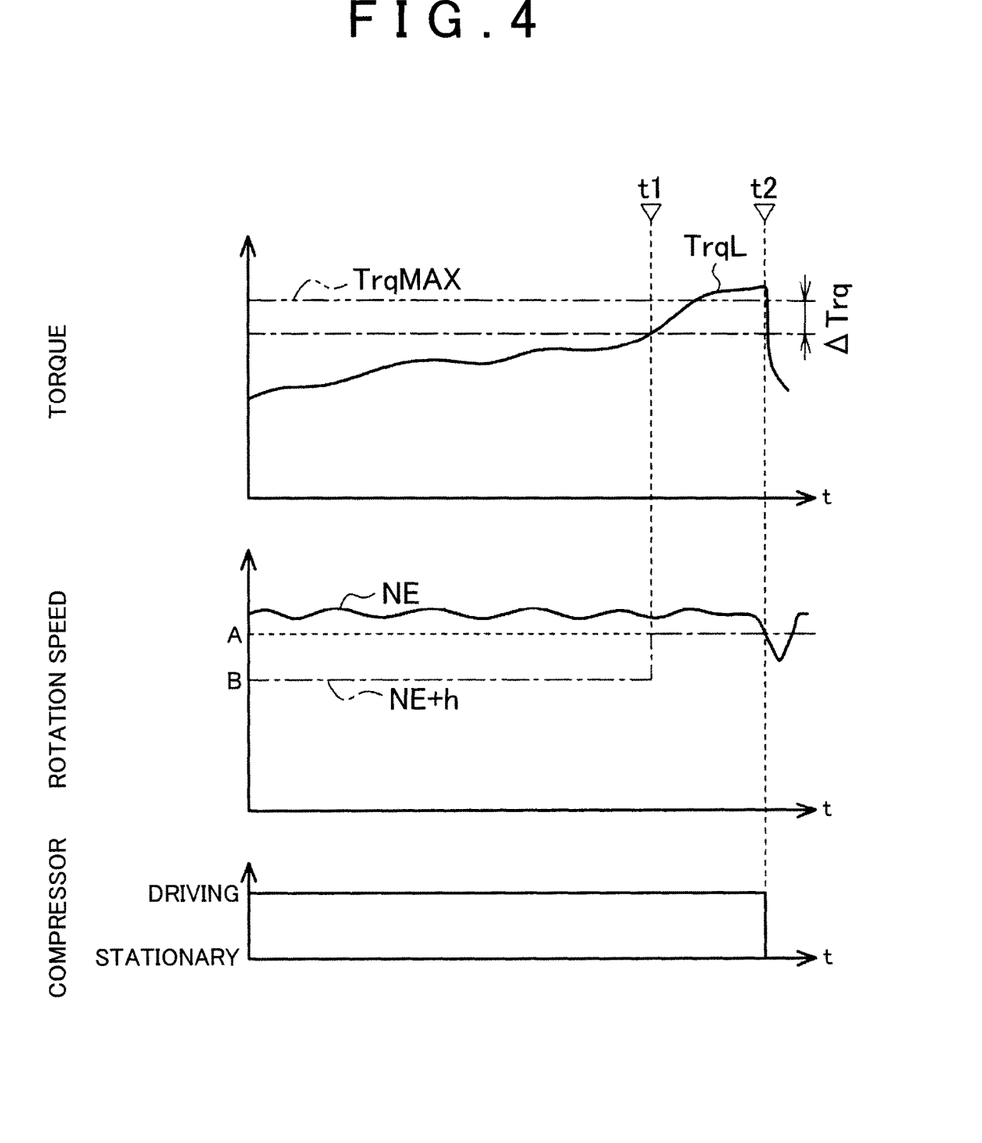
FIG. 4 is a time chart illustrating how a load torque, a rotation speed, and a compressor state change.

FIG. 4 shows how the maximum torque TrqMAX and the load torque TrqL change, how the rotation speed NE and the predetermined speed NEth change, and how the compressor 42 is driven or stopped.

Prior to time t1, the predetermined speed NEth has the reference value B, as illustrated in the drawing, since the value that is obtained by subtracting the load torque TrqL from the maximum torque TrqMAX exceeds the predetermined value ΔTrq. When the value that is obtained by subtracting the load torque TrqL from the maximum torque TrqMAX becomes equal to or less than the predetermined value ΔTrq at time t1, the predetermined speed NEth rises to the anti-stall value A. Then, the compressor 42 is in the driving state, even when the load torque TrqL exceeds the maximum torque TrqMAX, while the rotation speed NE exceeds the predetermined speed NEth. Then, at time t2, the rotation speed NE becomes equal to or less than the predetermined speed NEth and the compressor 42 is put into the stationary state by the ECU 44 based on a command from the ECU 70. In this manner, the load torque that is applied to the crankshaft 28 from the outside decreases by the same amount as the auxiliary machine load torque applied to the crankshaft 28 by the compressor 42. Accordingly, the maximum value of the shaft torque has room against the auxiliary machine load torque applied to the crankshaft 28 by the auxiliary machines, and thus the shaft torque of the internal combustion engine 10 can have a value that is sufficient to raise the rotation speed NE. In this manner, the rotation speed NE is restored to the target speed NE*. In this case, the target speed NE* remains equal to that during the driving of the compressor 42. In addition, the stationary state of the compressor 42 is maintained for a predetermined period of time, even when the rotation speed NE exceeds the predetermined speed NEth, after the compressor 42 is stopped.

The presence of the period when the rotation speed NE of the internal combustion engine 10 is not reduced even when the load torque TrqL exceeds the maximum torque TrqMAX is because the maximum torque TrqMAX and the load torque TrqL are erroneous. In a case where the compressor 42 is put into the stationary state by the value that is obtained by subtracting the load torque TrqL from the maximum torque TrqMAX becoming equal to or less than zero, the compressor 42 may be unnecessarily stopped due to the error. In this embodiment, however, the compressor 42 is put into the stationary state based on an actual decline in the rotation speed NE, and thus the driving state of the compressor 42 can be maintained as long as possible while the engine stall is inhibited.

The compressor 42 is stopped in a case where the idle operation is released by an accelerator operation when the value that is obtained by subtracting the load torque TrqL from the maximum torque TrqMAX is close to the predetermined value ΔTrq. This is realized by using a known logic for stopping the compressor 42 in a case where a torque shortage occurs when an increase in the shaft torque of the internal combustion engine 10 is required.

This embodiment described above can achieve the following effects. (1) The predetermined speed NEth is raised when the value that is obtained by subtracting the load torque TrqL from the maximum torque TrqMAX is equal to or less than the predetermined value ΔTrq. Accordingly, an engine stall situation can be inhibited. Especially, the predetermined speed NEth is raised to the anti-stall value A when the value that is obtained by subtracting the load torque TrqL from the maximum torque TrqMAX is equal to or less than the predetermined value ΔTrq, and thus a situation in which the compressor 42 is stopped can be inhibited along with the engine stall situation compared to a case where the predetermined speed NEth remains set to the anti-stall value A at all times.

(2) The compressor 42 is put into the stationary state when the rotation speed NE is equal to or less than the predetermined speed NEth. Herein, the auxiliary machine load torque that is applied to the crankshaft 28 by the compressor 42 is relatively large, and thus the maximum value of the shaft torque that can be realized in the internal combustion engine 10 has room when the compressor 42 is put into the stationary state. Accordingly, the rotation speed NE can be restored to the target speed NE*.

(3) The compressor 42, which does not affect functions relating to the traveling of the vehicle, is the object of a decrease in the auxiliary machine load torque. Accordingly, a situation can be inhibited in which the functions relating to the traveling are affected by the control for restoring the rotation speed NE to the target speed NE*.

(4) The maximum torque TrqMAX is variably set based on the outside air temperature THO and the outside air pressure PO. Accordingly, a situation can be inhibited in which it is determined that the value that is obtained by subtracting the load torque TrqL from the maximum torque TrqMAX is equal to or less than the predetermined value ΔTrq when the maximum value of the shaft torque which can be realized has room. Accordingly, a situation in which the compressor 42 is stopped can be inhibited along with the engine stall situation.

In the embodiment described above, the compressor 42 corresponds to a predetermined auxiliary machine, the part that performs the processing of time t2 in FIG. 4 by the ECUs 44, 70 corresponds to a reduction processing unit, the processing of Step S10 corresponds to a maximum torque acquisition processing unit, and the processing of Step S12 corresponds to a load torque acquisition processing unit. In addition, the reference value B corresponds to a first value and the anti-stall value A corresponds to a second value.

Second Embodiment

Hereinafter, a second embodiment of the rotation speed control device for an internal combustion engine will be described with reference to accompanying drawings. The following description will focus on how the second embodiment differs from the first embodiment.

In the first embodiment described above, the predetermined speed NEth is set to one of the reference value B and the anti-stall value A. In this embodiment, however, the predetermined speed NEth is continuously changed in accordance with the value that is obtained by subtracting the load torque TrqL from the maximum torque TrqMAX. Specifically, a continuously increasing value is set as the predetermined speed NEth as the value that is obtained by subtracting the load torque TrqL from the maximum torque TrqMAX decreases.

Figure 5A:
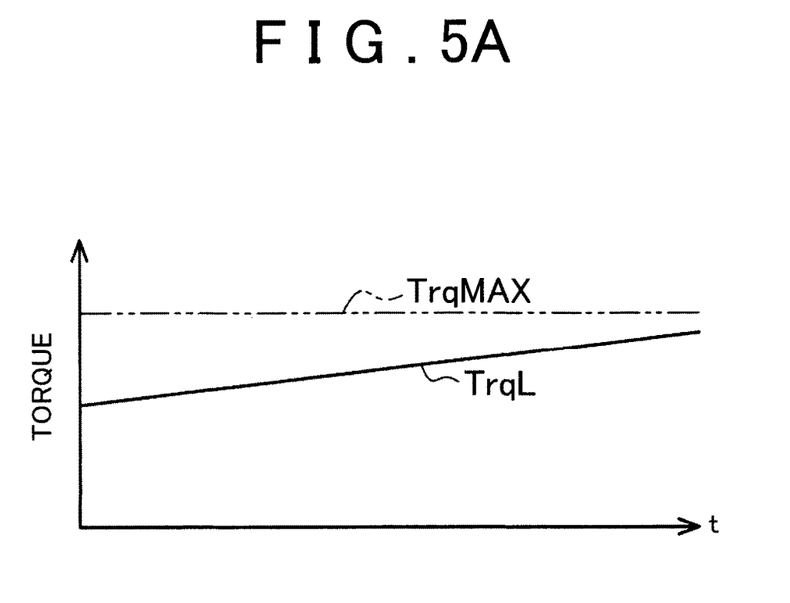
FIG. 5A is a time chart illustrating how the load torque changes.
Figure 5B:
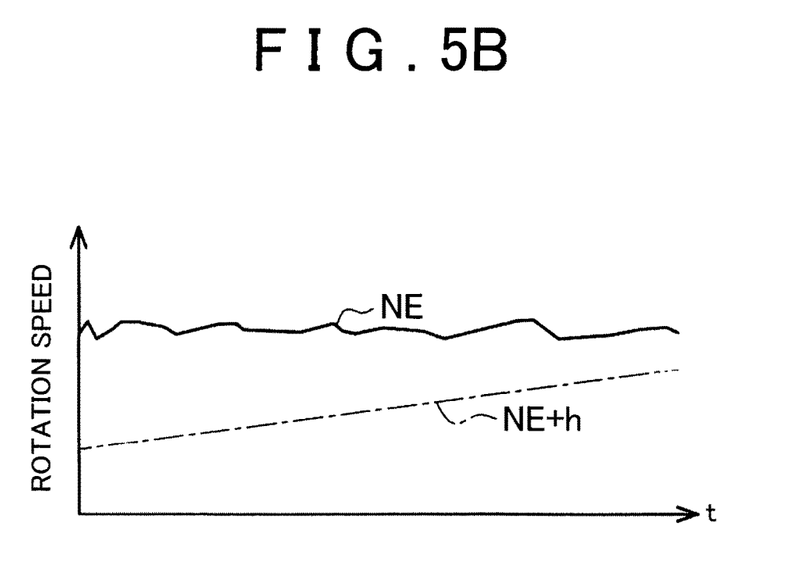
FIG. 5B is a time chart illustrating how the rotation speed changes.

FIG. 5A illustrates how the maximum torque TrqMAX and the load torque TrqL change, and FIG. 5B illustrates how the rotation speed NE and the predetermined speed NEth change. In this embodiment, the predetermined speed NEth is gradually increased as the value that is obtained by subtracting the load torque TrqL from the maximum torque TrqMAX is gradually decreased as illustrated in the drawings. In other words, when a value other than the maximum value and the minimum value of the value illustrated in FIG. 5A as the value that is obtained by subtracting the load torque TrqL from the maximum torque TrqMAX is assumed as a predetermined value, the predetermined speed NEth is set to a greater value in a case where the predetermined value is exceeded than in a case where the predetermined value is not exceeded.

Herein, the amount of a decline in the rotation speed NE pertaining to a case where the rotation speed NE declines for any reason and allowing the restoration of the rotation speed NE to the target speed NE* without stopping the compressor 42 is considered to decrease as the room of the maximum torque TrqMAX decreases. Accordingly, the predetermined speed NEth can be set to the minimum level possible when the predetermined speed NEth is gradually increased in the manner described above. Accordingly, the stopping of the compressor 42 can be prevented as long as possible.

Other Embodiments

Each of the embodiments described above may be modified as follows. Regarding the maximum torque, the maximum torque TrqMAX is calculated based on the outside air temperature THO and the outside air pressure PO in the embodiments described above. However, the calculation of the maximum torque TrqMAX may employ fixed outside air temperature and outside air pressure values determined in advance instead of the outside air temperature THO and the outside air pressure PO detected each time.

The maximum torque TrqMAX is not limited to what is obtained by subtracting the load torque of the pumping loss equivalent from the indicated torque. For example, the maximum torque TrqMAX may be a shaft torque. Even in this case, processing that is mathematically equivalent to the processing of Step S14 can be realized when the load torque TrqL is the auxiliary machine load torque calculated by the auxiliary machine torque calculating unit M18 and the friction load torque calculated by the friction calculating unit M20 is excluded. However, the invention is not limited thereto. For example, the indicated torque may be the maximum torque TrqMAX and the load torque TrqL may be the same as that in the embodiments described above. Although the load torque of the pumping loss equivalent is not taken into account in this case, a situation in which the timing at which the predetermined speed NEth is raised is delayed can be inhibited when the predetermined value ΔTrq is appropriately set.

Regarding the auxiliary machine torque calculating unit, the auxiliary machine load torque applied to the crankshaft 28 by the alternator 52 is calculated based on the target speed NE* and the required electric power generation current in the embodiment described above. However, the invention is not limited thereto. For example, the auxiliary machine load torque applied to the crankshaft 28 by the alternator 52 may be calculated based on the target speed NE* and a detected electric power generation current value or may be calculated based on the rotation speed NE and the detected electric power generation current value. In addition, the calculated value of the auxiliary machine load torque applied to the crankshaft 28 by each auxiliary machine not limited to the alternator 52 may be the auxiliary machine load torque currently applied to the crankshaft 28 by the auxiliary machine, the auxiliary machine load torque applied later through control to the crankshaft 28 by the auxiliary machine, or the intermediate value thereof or the like.

Regarding the load torque, the load torque that is applied to the crankshaft 28 by the transmission 29 is not taken into account in the crankshaft 28 during the calculation of the load torque TrqL in the embodiments described above. However, it is desirable that the load torque that is applied to the crankshaft 28 by the transmission 29 is taken into account in a case where, for example, the transmission 29 is provided with a torque converter. In this case, the load torque that is applied to the crankshaft 28 by the transmission 29 may be calculated in view of, for example, the temperature of a fluid in the torque converter. The load torque that is applied to the crankshaft 28 by the transmission 29 or the like can also be taken into account during the setting of the predetermined value ΔTrq instead of the load torque that is applied to the crankshaft 28 by the transmission 29 or the like being ignored during the calculation of the load torque TrqL. In other words, the predetermined value ΔTrq may be set to a value exceeding zero and this value may be set in view of the ignoring of the load torque applied to the crankshaft 28 by the transmission 29 or the like in the load torque TrqL.

Regarding the setting processing unit, the predetermined speed NEth may be set to the anti-stall value A in a case where, for example, "TrqL/TrqMAX" is at least a specified ratio α in the first embodiment described above. Herein, this processing is mathematically equivalent to the processing of Step S14 in FIG. 3 when "-(α-1)·TrqMAX=ΔTrq" is satisfied.

In the second embodiment described above, a continuously increasing value is set as the predetermined speed NEth as the value that is obtained by subtracting the load torque TrqL from the maximum torque TrqMAX decreases. However, the invention is not limited thereto. For example, a value increasing in two or more steps may be set as the predetermined speed NEth as the value that is obtained by subtracting the load torque TrqL from the maximum torque TrqMAX decreases.

Regarding the reduction processing unit, the compressor 42 is put into the stationary state when the rotation speed NE is equal to or less than the predetermined speed NEth in the embodiment described above. However, the invention is not limited thereto. For example, the auxiliary machine load torque applied to the crankshaft 28 by the compressor 42 may be decreased with a value exceeding zero. This can be realized by, for example, changing the piston stroke of the compressor 42 into a value smaller when the rotation speed NE is equal to or less than the predetermined speed NEth than when the rotation speed NE exceeds the predetermined speed NEth.

The predetermined auxiliary machine as an object of torque decrease is not limited to the compressor 42. In a case where the degree of a request for charging the battery 60 is relatively low, for example, the auxiliary machine load torque applied to the crankshaft 28 by the alternator 52 may be decreased when the output electric power of the alternator 52 is decreased. The degree of the charging request may be determined to be low in a case where there is a downhill at a point within a specified distance on a vehicle traveling route by, for example, using an output signal from a navigation system.

A countermeasure against an increase in the load torque TrqL is not limited to the processing for raising the predetermined speed NEth. In a case where the ECU 70 makes a positive determination in Step S14 in FIG. 3, for example, processing (change processing) for changing the target air-fuel ratio into an air-fuel ratio allowing the output to increase or for changing the valve timings of the intake valve 18 and the exhaust valve 30 into timings allowing the torque to increase may be performed in addition to the processing of Step S16. In other words, the change processing described above may be executed in addition to the processing for raising the predetermined speed NEth when what is obtained by subtracting the load torque TrqL from the maximum torque TrqMAX is decreased by the control performed by the idle control processing unit. When a retard operation is performed on the ignition timing so that the rotation speed NE is maintained at the target speed NE* in this case, the difference (reserve torque) between the maximum torque that can be realized by advancing the ignition timing and the current torque can be increased. Eventually, it is possible to inhibit the rotation speed NE from becoming equal to or less than the predetermined speed NEth.

Regarding the target speed, the target speed NE* is changed when the compressor 42 is driven or stopped in the embodiments described above. However, the invention is not limited thereto. For example, the target speed NE* may have a common value when the compressor 42 is driven and stopped. As another example, the target speed NE* may have two types of values with a switching condition not related to the presence or absence of the driving of the compressor 42. In addition, the target speed NE* may be changeable into three or more values.

Regarding the idle control processing unit, the required torque Trq* may be the shaft torque and the actuator may be operated in accordance therewith. Even in this case, control similar to that in the embodiment described above is carried out when, for example, the operation amount calculating unit M26 operates the actuator based on the required torque Trq* so that the actual shaft torque becomes the required torque Trq*. This can be realized by, for example, the operation amount calculating unit M26 operating the actuator based on the coolant temperature THW and the oil temperature THA in addition to the required torque Trq*.

In the embodiments described above, valve characteristics such as the valve timing are single characteristics set during the idle operation. However, the invention is not limited thereto. In a case where the required torque Trq* is increased, for example, control for changing the valve timing during the idle operation may be adopted. In this case, the maximum value of the torque of the internal combustion engine 10 pertaining to a case where various valve timings available are set may be the maximum torque TrqMAX.

In the embodiments described above, the target air-fuel ratio is fixed to the theoretical air-fuel ratio during the idle operation. However, the invention is not limited thereto. In a case where the required torque Trq* is increased, for example, control for changing the target air-fuel ratio into an air-fuel ratio (such as an output air-fuel ratio at which the torque is maximized) other than the theoretical air-fuel ratio during the idle operation may be adopted. In this case, the maximum value of the torque of the internal combustion engine 10 pertaining to a case where various target air-fuel ratios are set may be the maximum torque TrqMAX.

The torque base value Trqb* may be calculated only from the open loop operation amount calculating unit M12 without the closed loop operation amount calculating unit M14. Also, the torque base value Trqb* may be calculated only from the closed loop operation amount calculating unit M14 without the open loop operation amount calculating unit M12.

The actuator of the internal combustion engine 10 does not necessarily have to be operated based on the required torque Trq*. For example, the operation amount output by the closed loop operation amount calculating unit M14 may be the operation amount of the actuator of the internal combustion engine 10. In this case, the maximum output for the idle operation tends to be designed to prevent the engine stall even in the case of the overshoot or the undershoot attributable to the closed loop control. In a case where the margin of the maximum output pertaining to this case is decreased, however, the maximum value of the shaft torque that can be realized in the internal combustion engine 10 may have no room against the auxiliary machine load torque applied to the crankshaft 28 by the auxiliary machine during the control for reaching the target speed NE*. In this case, it is effective to change the predetermined speed NEth in the manner described with regard to the embodiment described above.

The internal combustion engine is not limited to a port injection- and spark ignition-type internal combustion engine. For example, the internal combustion engine may be an in-cylinder injection- and spark ignition-type internal combustion engine. Also, the internal combustion engine is not limited to the spark ignition-type internal combustion engine and examples thereof may include a compression ignition-type internal combustion engine such as a diesel engine. In this case, the operation amount for the control for reaching the target speed NE* may be an injection amount or an injection timing. In addition, the internal combustion engine may have a supercharger mounted thereon. In this case, the maximum value of the shaft torque that can be realized during the idle operation is likely to have no room, and thus the utility value of the processing for allowing the predetermined speed NEth to vary in the manner described with regard to the embodiment described above is especially high.

The compressor 42 is not limited to a variable capacity-type compressor. Even when variable capacity control is unavailable, the load of the compressor 42 can become zero when the rotation speed NE becomes equal to or greater than the predetermined speed NEth insofar as there is provided a clutch that mechanically connects or disconnects the rotating shaft of the compressor 42 to or from the crankshaft 28. Accordingly, effects similar to those of the embodiment described above can be achieved.

The invention claimed is:

1. A control device for an internal combustion engine applied to a vehicle, the control device comprising:
at least one electronic controller configured to:
i) execute idle control for controlling a rotation speed of a crankshaft of the internal combustion engine to reach a target speed for an idle operation,
ii) decrease a first torque when the rotation speed of the internal combustion engine becomes equal to or less than a predetermined speed during the execution of the idle control, the first torque being a torque applied to the crankshaft of the internal combustion engine by an auxiliary machine mounted on the vehicle,
iii) during the execution of the idle control,
  a) acquire a second torque, the second torque being a maximum torque that the internal combustion engine is capable of generating, and
  b) acquire a third torque, the third torque being a load torque related to the internal combustion engine including the first torque, and
iv) obtain a value from the second torque and the third torque, the value being a torque difference by which a maximum value of a shaft torque capable of being realized in the internal combustion engine exceeds the first torque, and set the predetermined speed during the execution of the idle control to be greater when the torque difference is equal to or less than a predetermined value compared to when the torque difference exceeds the predetermined value.

2. The control device according to claim 1, wherein the electronic controller is configured to variably set the second torque in accordance with at least one of a temperature of outside air and a pressure of the outside air.

3. The control device according to claim 1, wherein the auxiliary machine is a compressor for an air-conditioning device mounted on the vehicle.

4. The control device according to claim 1, wherein the electronic controller is configured to:
  i) set the predetermined speed to a first value when the torque difference exceeds the predetermined value, and
  ii) set the predetermined speed to a second value larger than the first value when the torque difference does not exceed the predetermined value.

5. The control device according to claim 1, wherein the electronic controller is configured to set the predetermined speed to a value increasing in two or more steps or continuously as the torque difference decreases.

6. The control device according to claim 1, wherein the electronic controller is configured to obtain the value that is the torque difference by subtracting the third torque from the second torque.

* * * * *

UNITED STATES PATENT AND TRADEMARK OFFICE
CERTIFICATE OF CORRECTION

| | |
|---|---|
| PATENT NO. | : 10,428,753 B2 |
| APPLICATION NO. | : 15/514392 |
| DATED | : October 1, 2019 |
| INVENTOR(S) | : Atsushi Fukuda et al. |

Page 1 of 1

It is certified that error appears in the above-identified patent and that said Letters Patent is hereby corrected as shown below:

On the Title Page

Item (86), the PCT No., is incorrect. Item (86) should read:
-- (86) PCT No.: PCT/IB2015/001644
  § 371 (c)(1),
  (2) Date: Sept. 18, 2015 --

Signed and Sealed this
Nineteenth Day of November, 2019

Andrei Iancu
*Director of the United States Patent and Trademark Office*